(No Model.)

C. W. HUBBARD.
SAW TOOTH.

No. 245,831. Patented Aug. 16, 1881.

WITNESSES
Jno K Smith
L. C. Fitler.

INVENTOR
Charles W. Hubbard
by his attys
Bakewell & Kerr

UNITED STATES PATENT OFFICE.

CHARLES W. HUBBARD, OF PITTSBURG, PENNSYLVANIA.

SAW-TOOTH.

SPECIFICATION forming part of Letters Patent No. 245,831, dated August 16, 1881.

Application filed April 30, 1881. (No model.)

*To all whom it may concern:*

Be it known that I, CHARLES W. HUBBARD, of Pittsburg, in the county of Allegheny and State of Pennsylvania, have invented a new and useful Improvement in Saw-Teeth; and I do hereby declare the following to be a full, clear, and exact description thereof, reference being had to the accompanying drawings, forming part of this specification, in which—

Figure 1:
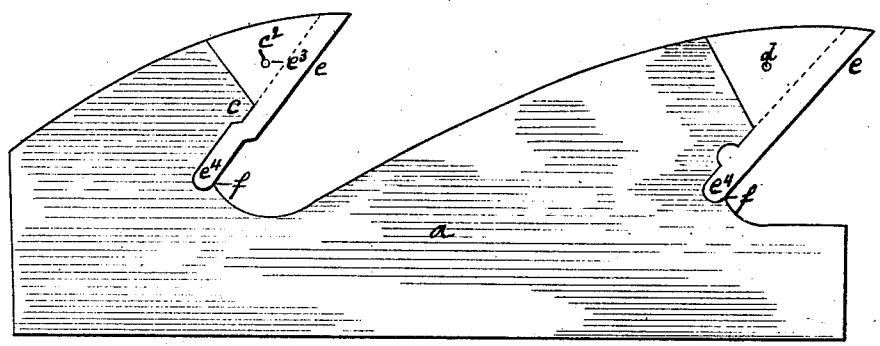
Figure 2:
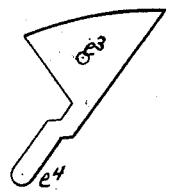
Figure 3:
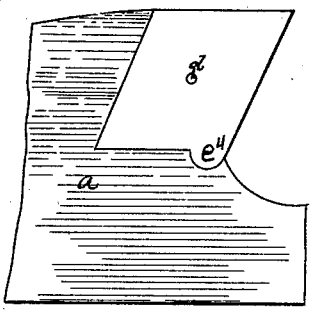
Figure 4:
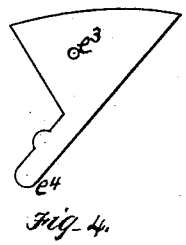
Figure 5:
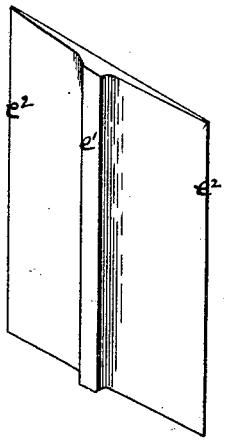
Figure 6:
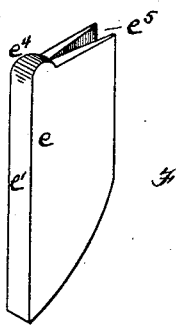
Figure 7:

Figure 1 is a side view of a section of a circular saw provided with my improved tooth. Fig. 2 is a like view of the tooth. Figs. 3 and 4 are views of modified forms. Fig. 5 is a view of the blank from which the teeth are made. Fig. 6 is a view of the blank bent without trimming. Fig. 7 is an edge view of a section of a saw provided with my improved tooth.

Like letters of reference indicate like parts in each.

The saw $a$ is made in the usual way, the recesses between the teeth being punched or cut out to form the throat. The front edge of the base or solid part $c$ facing the throat is then ground off beveling on each side, as at $c'$, and drilled or punched, as at $c^2$, for the reception of the rivet which secures the removable part thereto. The hood or removable part $e$ of the tooth, which extends into the throat, is made of steel from a blank such as is shown in Fig. 5, which has a central rib, $e'$, and tapers therefrom to the edges, as at $e^2$. This blank may be made by rolling in bar form, and the bar cut in sections; or it may be made in a die. The blank so formed is sheared or cut to the desired shape, heated, and bent as shown in Fig. 5, so as to make the rib $e'$ the edge. The rivet-hole $e^3$ is then drilled or punched in the leaves. It is provided with a heel, $e^4$, which, when it is put in place, enters a corresponding recess, $f$, at the base of the solid part of the tooth, $c$. The cavity $e^5$ of the hood $e$ corresponds in shape to the sharpened or beveled edge $c'$ of the solid part of the tooth. The hood $e$, thus made, is put on the solid part of the tooth, $c$, extends up into the throat, so as to be braced against the line of applied force, and is secured by a rivet, $d$, as shown in Figs. 1, 3, and 7. It requires but little work and skill to apply it, and when put on is perfectly firm and not liable to displacement. It is cheap in manufacture, satisfactory in use, and can be applied to any saw. It is also useful in the manufacture of insertible teeth, as it supplies thereto a cheap and easily renewed cutting-edge. A much better saw can be made with this than with the old form of tooth, as it is possible to produce a harder, more uniform, and more carefully-made cutting-edge therewith.

The principal advantage of my invention is that it does not require the cutting down into the plate below the circle of the throat of the teeth, as in the case of an inserted tooth, and hence does not affect the strain of the blade.

The tooth thus made may be termed a "shod" or "relayed" tooth. In case of breakage the part $e$ only would probably require renewal. The joining edges of the parts $c$ and $e$ are tapering or scarfed sufficiently to rivet the overlapping edges.

I am aware that hardened nibs or points with and without holders have been attached to the extremities of saw-teeth by peripheral rabbets, rivets, &c., and do not herein claim the same, for the reason that the tooth is not thereby relieved from wear along the main portion of its cutting-edge, the nib is not properly supported in the line of applied force, and will work loose and strip off, and for the further reason that where such nibs are applied directly to the tooth the tooth will have to be carefully tempered.

What I claim as my invention, and desire to secure by Letters Patent, is—

1. A relayed saw-tooth, consisting of a body part having a beveled edge which extends above the throat, and a hood or removable part beveled to fit the bevel of the tooth and projecting into the throat below the bevel, said hood adapted to be secured to the tooth, substantially as and for the purpose specified.

2. A relayed saw-tooth, consisting of a body part having a beveled edge which extends above the throat, a hood or removable part beveled to fit the bevel of the tooth and projecting into the throat below the bevel, and a heel projecting into a recess in the throat, substantially as and for the purpose specified.

In testimony whereof I have hereunto set my hand.

CHARLES W. HUBBARD.

Witnesses:
T. B. KERR,
THOS. BAKEWELL.